United States Patent [19]

Lindörfer et al.

[11] 4,284,509

[45] Aug. 18, 1981

[54] PROCESS FOR REMOVING OILS OR PETROLEUM FROM THE SURFACE OF THE SEA

[75] Inventors: Walter Lindörfer, Kassel; Fritz Wagner, Stöckheim; Wilhelm Jahn-Held, Staufenberg; Walther Schulz, Vechta, all of Fed. Rep. of Germany

[73] Assignee: Gesellschaft fur Biotechnologische Forschung, Brunswick, Fed. Rep. of Germany

[21] Appl. No.: 94,865

[22] Filed: Nov. 15, 1979

[30] Foreign Application Priority Data

Mar. 21, 1979 [DE] Fed. Rep. of Germany ....... 2911016

[51] Int. Cl.$^3$ .............................................. C02F 1/54
[52] U.S. Cl. .................... 210/610; 210/730; 210/922; 210/925; 435/135; 435/281; 435/863; 435/872
[58] Field of Search ................... 210/2, 11, 43, 47, 54, 210/59, DIG. 26, DIG. 27, 601, 606, 610, 611, 708, 730, 749, 922, 925; 435/134, 281, 863, 872, 135

[56] References Cited

U.S. PATENT DOCUMENTS

| | | | |
|---|---|---|---|
| 3,561,601 | 2/1971 | McNeely | 210/DIG. 26 |
| 3,637,461 | 1/1972 | Tanaka et al. | 435/105 |
| 3,871,956 | 3/1975 | Azarowics | 210/11 |
| 3,909,356 | 9/1975 | Suzuki et al. | 435/872 |
| 4,146,470 | 3/1979 | Mohan et al. | 210/11 |
| 4,230,801 | 10/1980 | Gutnick et al. | 210/611 |

OTHER PUBLICATIONS

Chemical Abstracts, 91:62037e, 1979, p. 307.

*Primary Examiner*—Peter A. Hruskoci
*Attorney, Agent, or Firm*—Haseltine and Lake

[57] ABSTRACT

After physical removal of the majority of the oil on the surface of the water, the thin film remaining is treated with microbial metabolites which reduce the surface and interface tension and cause the formation of oil agglomerates. These agglomerates may be drawn off or left to be degraded by hydrocarbon-degrading microorganisms normally present in the sea water or added thereto.

6 Claims, No Drawings

PROCESS FOR REMOVING OILS OR PETROLEUM FROM THE SURFACE OF THE SEA

The invention relates to the restoration of the ecological equilibrium in oil-polluted sea water or coastal waters, such as shoals, for example.

For removal of oil pollution from sea water, it has already been proposed to sprinkle the oil-polluted sea water with inorganic substances which selectively adsorb oil and, after adsorption is complete, to remove them from the sea water. According to the teaching of DE-PS No. 11 67 278, thermally expanded vermiculites can be used as the adsorbent substances. According to other teachings, these substances should only be added after a hydrophobic treatment. In DE-OS No. 28 06 851, mixtures of magnesium compounds, such as for example magnesium hydroxide, silicate or phosphate, or dolomite, magnesite, vermiculite and a crosslinkable polymer such as, for example, polyethylene or an ethylene-acrylic acid copolymer, after they have been kneaded, are used as the oil-adsorbing substances. This kneading may also be carried out in a melt and in the presence of a cross-linking agent.

These adsorption agents require considerable technical expense in their production alone, and can only be removed from the sea water after adsorbing the oil at an even greater cost. Moreover, the oil-containing solids remaining from such processes can only be disposed of or processed with difficulty.

To avoid the use of such solids, DE-OS No. 27 57 041 describes an apparatus for removing oil-containing substances from the surface of the water, which consists of a plurality of vertically rotating discs partially immersed in the liquid phase and designed so as to remove the oil from the surface of the water and convey it into a container in which it is collected for further processing. The oil-containing sea water removed from the oil-polluted area has to be fed into this apparatus separately and also be pumped out of the apparatus again. This alone is technically expensive. Moreover, in practice, when this apparatus is used, it is impossible to collect all the oil-containing water. If the apparatus is used for treating oil pollution in shoals or other coastal waters, considerable quantities of sea sand and mud are sucked in with the oil-polluted water, which are a burden on the throughput capacity of the known apparatus and causes increased wear of the components.

From DE-AS No. 26 54 909, a process for removing pollution from fresh or salt water caused by petroleum or petroleum products is known, wherein preparations are used which are based on salts with limited solubility in water, which are rendered lipophilic and capable of floating by paraffining and which contain nitrogen and phosphorus in forms which can be assimilated by hydrocarbon-degrading microorganisms living in the water. As the slow-acting nitrogen source these preparations should contain urea derivatives of aldehydes which are rendered lipophilic and capable of floating by paraffining. The floating ability of these preparations can be further improved by the additions of carriers, such as expanded vermiculite, for example. The use of such substances which are suitable as nutrients for the hydrocarbon-degrading microorganisms is intended to accelerate the naturally occurring biological decomposition of the oil contained in the water, with at most the carriers remaining after the nutrients in the preparation have been used up. The paraffining of this preparation used in known processes involves technical expense which should in itself be avoided.

This raises the problem of finding technically simple methods of removing oils or petroleum hydrocarbons, wherein substances which accelerate the naturally occurring biological decomposition of the oils or petroleum hydrocarbons are also used.

A process of removing oils or petroleum hydrocarbons hereinafter called "oil" from the surface of the sea, more particularly from shoals, which are left behind after the oil floating on the water has been pumped away or otherwise removed has now been found. In this process, metabolites of microorganisms which reduce the surface and interface tension of the oil system of the aqueous phase are applied to the oil slick remaining on the surface of the water and then the oil which agglomerates is removed from the surface of the water.

The invention proceeds from the observation that the naturally occurring microorganisms, with or without a supply of additional nutrients, can only degrade oil or oil-containing substances if there is sufficient oxygen available and if there is also a constant supply of fresh oxygen.

To ensure an adequate oxygen supply to the microorganisms living in the sea water, the sealed layer of oil floating on the sea must first be broken up. Accordingly, in order to perform the process according to the invention, the majority of the oil floating on the water must first be removed by pumping or by some other method known per se. During pumping, an oil and water mixture is formed which may, for example, be totally freed from oil by means of a plurality of layers of thermally expanded vermiculite arranged one behind the other. The oil content of the vermiculite can be used for the generation of heat. Burners suitable for burning oil/solids mixtures of this kind are described in German patent applications Nos. P 19 17 666 and P 19 25 899. However, it is also possible to separate the oil and water mixture by making use of the different densities of its components. This separation can be accelerated by introducing finely-divided air into the mixture. A process of this kind is described in DE-PS No. 16 42 898.

After the majority of the oil has been removed, a residual amount still remains on the surface of the water, again forming a sealed slick which impedes the supply of oxygen to the water. According to the invention, metabolites of microorganisms which reduce the surface and interface tension in the oil/aqueous phase system are applied to this layer of oil. The effect of these metabolites is to break up the layer of oil and the oil forms agglomerates. Thanks to the movement of the now substantially free surface of the water, this breaking-up of the oil slick allows oxygen to reach the sea water, thus ensuring and promoting the existence of the oil-degrading microorganisms. The agglomerated consolidated oil can be drawn off from the surface of the water and be further processed in the same way as the majority of the oil which has already been removed. However, it is more advantageous to add degrading microorganisms and the nutrients required to sustain them to the agglomerated oil removed from the surface of the water.

Obviously, the metabolites to be used according to the invention also substantially increase the biological activity of the oil-degrading microorganisms, with the result that the decomposition of the oil is accelerated. For this reason, the agglomerated oil can also be left on the surface of the sea, as it is degraded relatively quickly by the microorganisms naturally found in sea water, which now have an increased biological activity, and thus the ecological balance is restored.

Similarly, hydrocarbon-degrading microorganisms and optionally the nutrients they require may be added to the agglomerated oil floating on the surface of the sea. In this way, the restoration of the ecological balance can be speeded up.

Microbially produced glycolipids which contain mono-, di- or oligosaccharides as the hydrophilic component have proved particularly satisfactory as metabolites for the process according to the invention. Glycolipids consisting of mono- or diesters of $\alpha, \alpha'$-trehalose and long-chained $\alpha$-alkyl-$\beta$-hydroxy fatty acids are equally effective.

Suitable glycolipids can also be produced by means of the microorganisms *Nocardia rhodochrous spezies* or *Mycobacterium phlei* from a mixture of alkanes with 12 to 19 carbon atoms in the molecule or from crude oil and can be used as metabolites for the process of the invention.

Advantageously, the glycolipids are sprayed onto the oil slick extending over the surface of the sea, in the form of an aqueous solution or dispersion which contains the glycolipids in amounts of from 0.01 to 5 g/l.

The process according to the invention can be performed using apparatus and methods which are known per se. It has the advantage that the use of the metabolites according to the invention, especially glycolipids and preferably trehalose lipids, is a simple and durable way of breaking up oil slicks on the surface of the sea, more particularly on the surface of shoals, and thus ensuring a supply of oxygen to the oil-degrading microorganisms naturally occurring in sea water or added thereto. Moreover, these metabolites prevent the undesirable mixing of oil and water. The process of the invention rapidly restores the natural ecological equilibrium of sea water or shoals affected by oil pollution, without forming residues which could themselves contaminate the sea.

The metabolites to be used according to the invention can be produced from natural raw materials by a natural process without incurring any great technical expense. No chemical/technical synthesis is required.

The metabolites used for the process of the invention, which are a mixture, thus constitute a surprisingly effective selection of substances which can be transported and stored in solid form without undergoing any change, just as they can be transported and stored in the form of an aqueous solution or dispersion or an aqueous concentrate.

The production of the metabolites required for the process according to the invention is illustrated in the following Example, but is not restricted thereto.

A 700 l bioreactor fitted with a Kaplan turbine and a cylindrical guide member is filled with 500 l of a nutrient solution with the following composition: 1000 g of $(NH_4)_2SO_4$, 500 g of $KH_2PO_4$, 1000 g of $K_2HPO_4.3H_2O$, 500 g of $Na_2HPO_4.2H_2O$, 250 g of KCl, 100 g of $MgSO_4.7H_2O$ and 100 g of yeast extract, dissolved in 500 l of fresh water, and 10 kg of nalkane mixture with a chain length of from $C_8$ to $C_{24}$, then inoculated with 50 l of inoculum of a *Nocardia rhodochrous spezies* culture, and cultivated at 32° C. at a ventilation rate of 1.0 vol./vol./min., at a rotation speed of 1,800 r.p.m. and at a pressure in the reactor of 2 bars.

During cultivation, the submerged culture is automatically adjusted to a pH of 6.8 by means of a pH regulating station, by adding a 25% by volume ammonia solution. After 32 hours, the submerged culture is transferred to a counterflow extraction apparatus and exhaustively extracted with 200 l of extraction agent consisting of 180 l of methylene chloride and 20 l of methanol. After the extraction agent has been evaporated off, 1.22 kg of glycolipid-containing crude extract are obtained, which are used to prepare the aqueous solution.

The crude extract contains the following glycolipids as its main components:

192 g of 6,6'-di-O-$\alpha$-tricanyl-$\beta$-hydroxy-docosanoly-$\alpha,\alpha'$-trehalose 178 g of 6,6'-di-O-$\alpha$-dodecanyl-$\beta$-hydroxy-docosanoly-$\alpha,\alpha'$-trehalose 144 g of 6,6'-di-O-$\alpha$-decanyl-$\beta$-hydroxy-pentacosanoyl-$\alpha,\alpha'$-trehalose

We claim:

1. A process for removing oil from the surface of the sea and from shoals, this oil being in the form of a layer left behind after the majority of the oil floating on the water has been pumped away or otherwise removed, comprising the steps of applying to said layer an effective amount of metabolites of microbially produced glycolipids which consist of mono- or diesters of $\alpha,\alpha'$-trehalose and $\alpha$-alkyl-$\beta$-hydroxy fatty acids having at least 10 carbon atoms in said alkyl group and which contain mono-, di- or oligo-saccharides as the hydrophilic component and which reduce the surface and interface tension of the oil/water system in order to form agglomerates of the oil, and then removing the agglomerates from the surface of the water.

2. The process according to claim 1, wherein the agglomerates are removed by allowing hydrocarbon-degrading microorganisms, which are naturally present in the sea water and which have increased biological activity due to the presence of the metabolites, to degrade the agglomerates.

3. The process according to claim 1, wherein the agglomerates are drawn off.

4. The process according to claim 1, wherein hydrocarbon-degrading microorganisms and nutrients required to sustain said microorganisms are added to the agglomerates.

5. The process according to claim 1, wherein the metabolites are glycolipids produced by means of the microorganisms *Nocardia rhodochrous spezies* or *Mycobacterium phlei* from a mixture of alkanes having 12 to 19 carbon atoms in the molecule or from crude oil.

6. The process according to claim 5, wherein the glycolipids are sprayed onto the layer of oil in the form of an aqueous solution or dispersion which contains the glycolipids in an amount of from 0.01 to 5 g/l.

* * * * *

UNITED STATES PATENT AND TRADEMARK OFFICE
CERTIFICATE OF CORRECTION

PATENT NO. : 4,284,509

DATED : August 18, 1981

INVENTOR(S) : Walter Lindörfer, Fritz Wagner, Wilhelm Jahn-Held, Walther Schulz

It is certified that error appears in the above-identified patent and that said Letters Patent is hereby corrected as shown below:

On the title page item [73] assignee should read as follows:

-- Gesellschaft Fur Biotechnologische Forschung, Braunschweig-Stockheim, and Wintershall Aktiengesellschaft, Kassel, Fed. Rep. of Germany, part interest.--.

Signed and Sealed this

Seventh Day of December 1982

[SEAL]

Attest:

GERALD J. MOSSINGHOFF

Attesting Officer — Commissioner of Patents and Trademarks